US011210583B2

United States Patent
Mathew et al.

(10) Patent No.: US 11,210,583 B2
(45) Date of Patent: Dec. 28, 2021

(54) USING PROXIES TO ENABLE ON-DEVICE MACHINE LEARNING

(71) Applicant: Apple Inc., Cupertino, CA (US)

(72) Inventors: Binu K. Mathew, Los Gatos, CA (US); Julia C. Ng, San Jose, CA (US); Jared L. Zerbe, Woodside, CA (US)

(73) Assignee: APPLE INC., Cupertino, CA (US)

( * ) Notice: Subject to any disclaimer, the term of this patent is extended or adjusted under 35 U.S.C. 154(b) by 869 days.

(21) Appl. No.: 15/275,355

(22) Filed: Sep. 24, 2016

(65) Prior Publication Data

US 2018/0025287 A1 Jan. 25, 2018

Related U.S. Application Data

(60) Provisional application No. 62/364,810, filed on Jul. 20, 2016.

(51) Int. Cl.
 *G06N 3/08* (2006.01)
 *G06N 20/00* (2019.01)
 *G06N 5/04* (2006.01)

(52) U.S. Cl.
 CPC ............. *G06N 3/08* (2013.01); *G06N 5/04* (2013.01); *G06N 20/00* (2019.01)

(58) Field of Classification Search
 CPC ............ G06N 5/04; G06N 20/00; G06N 3/08
 See application file for complete search history.

(56) References Cited

U.S. PATENT DOCUMENTS

| | | | |
|---|---|---|---|
| 8,370,280 B1 * | 2/2013 | Lin | G06N 20/00 706/12 |
| 2010/0312555 A1 | 12/2010 | Plumpe et al. | |
| 2015/0106052 A1 | 4/2015 | Balakrishnan et al. | |
| 2015/0347519 A1 * | 12/2015 | Horn | G06F 16/2457 707/722 |
| 2016/0062985 A1 * | 3/2016 | Epstein | G06F 40/216 704/9 |
| 2016/0213974 A1 * | 7/2016 | Balakrishnan | A61B 5/1123 |
| 2017/0032257 A1 * | 2/2017 | Sharifi | G06F 16/24578 |

(Continued)

OTHER PUBLICATIONS

Barnabas Poczos et al., "Nonparrametric Divergence Estimation with Applications to Machine Learning on Distributions", Feb. 14, 2012, 10 pages. (Year: 2012).*

(Continued)

*Primary Examiner* — Eric Nilsson
(74) *Attorney, Agent, or Firm* — Womble Bond Dickinson (US) LLP

(57) ABSTRACT

Systems and methods are disclosed for a server generating a plurality of proxy prediction models for each of a plurality of applications for use by client devices. Providing a prediction model based on a data distribution that more closely matches the user private data of the actual user of the client device, as opposed to a generic model, can improve the accuracy of predictions and improve the benefits to the user of the client device. The plurality of prediction models are generated by a server and provided to a plurality of clients. For a particular application, a client device can use previously collected private user data to select one of the plurality of prediction models for the application as being a closest matching prediction model to use for a particular user.

30 Claims, 8 Drawing Sheets

(56) References Cited

U.S. PATENT DOCUMENTS

2017/0256254 A1* 9/2017 Huang .................... G10L 15/02
2017/0358293 A1* 12/2017 Chua ....................... G10L 13/08

OTHER PUBLICATIONS

Emiliano Miluzzo et al., "Vision: mClouds—Computing on Clouds of Mobile Devices", Proceedings of the 3rd ACM Workshop on Mobile Cloud Computing and Services, Jun. 25, 2012, pp. 9-13.
Emiliano Miluzzo et al., "Darwin Phones: The Evolution of Sensing and Inference on Mobile Phones", Proceedings of the 8th International Conference on Mobile Systems, Applications and Services, Jun. 15-18, 2010, pp. 5-20.
Barnabas Póczos et al., "Nonparrametric Divergence Estimation with Applications to Machine Learning on Distributions", Feb. 14, 2012, 10 pages.
International Search Report and the Written Opinion for application No. PCT/US2017/042215, dated Oct. 17, 2017, pp. 13 pages.
Examination Report for European Patent Application No. 17743453.7 dated Apr. 9, 2021, 5 pages.
PCT International Preliminary Report on Patentability for PCT/US2017/042215, dated Jan. 31, 2019.

* cited by examiner

```
<artist>Eagles</artist>
<album>Eagles</album>
<track>1 - Take it Easy</track>
<duration>3:27</duration>
<release>June 15, 1972</release>
<genre>Rock</genre>
<genre>Easy Listening</genre>
<demographic>45-65</demographic>
<format>MP3</format>
<bit-rate>16kHz</bit-rate>
<bit-depth>8-bits</bit-depth>
```

USING PROXIES TO ENABLE ON-DEVICE MACHINE LEARNING

RELATED APPLICATIONS

This United States Patent application claims priority under 35 U.S.C. § 119(e) of U.S. Provisional Patent Application No. 62/364,810, filed Jul. 20, 2016, and entitled "USING PROXIES TO ENABLE ON-DEVICE MACHINE LEARNING," which is incorporated herein by reference to the extent that it is consistent with this disclosure.

TECHNICAL FIELD

This disclosure relates to the field of machine learning on a client device.

BACKGROUND

Conventional machine learning relies on gathering large data sets and training prediction models from a large sample of users. The prediction model is trained to achieve the highest possible prediction accuracy on the training dataset, but will often need to be personalized for individual users by taking into account a particular user's personal data. An example would be a handwriting recognition algorithm that is adapted to a particular user's style of writing or a health sensor algorithm that is adapted, or calibrated, to a particular user's heartbeat or activity pattern. A speech recognition subsystem may need to be tailored to a particular user's speech patterns or inflections. A music suggestion subsystem is preferably tailored to the particular user's tastes, preferences, and listening patterns.

In the prior art, machine learning that is used to enhance a particular user's experience can be trained on the client device using the particular user's data only. Training using only on-device data preserves privacy at the cost of training accuracy and time. A machine learning algorithm typically needs to collect a substantial amount of data before machine learning can generate reasonably accurate prediction models. In some cases, such as health sensors that measure one or more attributes of a user's physical body, the sensor may need to be calibrated to that person before the data collected can be used by a machine learning algorithm to generate predictors on the client device for that user. Calibration of a sensor to a particular human can be intrusive, very personal, and time consuming and thus an undesirable step that a user may not wish to take.

Another way to generate a machine learning prediction model that can be used to enhance a user's on-device experience can include a server system collecting a substantial amount of crowd-sourced data that can be used to generate one or more prediction models. This method of training predictors collects a user's personal data and may violate privacy, even if the information collected is de-identified. If privacy is maintained, then another problem with training predictors using crowd-sourced data is that a server does not know which prediction model, among a plurality of predictive models for, e.g. music preferences, a particular client should use. Maintaining privacy means ensuring that the server cannot identify a particular client with any specificity. If the server cannot identify a particular client with specificity, e.g. due to privacy constraints, then the server cannot provide a personalized prediction model to the client device to enhance the user's on-device experience.

SUMMARY OF THE DESCRIPTION

Systems and methods are disclosed for enhancing a user's experience when using a client device by providing a plurality of prediction models for each of a plurality of applications on the client device. Providing a prediction model that more closely matches the actual user of the client device can improve the speed and accuracy of machine learning of a prediction model that represents the user of the client device. The term "model," as used herein, in one embodiment, refers to a data distribution, or a sketch of a data distribution, together with a machine learning model. Thus, each model has a corresponding data distribution. The phrase "matching a model" or "comparing a model," as used herein, in one embodiment, refers to performing a divergence estimation on a data distribution of a first model and a data distribution of a second model to determine an estimated divergence between the first and second data distributions.

The plurality of prediction models are generated by a server and provided to a plurality of clients. For a particular application, a client device can use previously collected private user data to select one of the plurality of prediction models for the application as being a closest matching prediction model to the particular user. The selected, close or closest matching one of the plurality of prediction models is used as a proxy prediction model ("proxy model") for the actual user of the client device. The client device can use private user data on the client device to further train or adapt the proxy model to more accurately predict or represent the preferences, characteristics, or calibration of a sensor to the user of the client device.

In an embodiment, a server can collect a substantial amount of anonymized, or de-identified user data (crowd-sourced data), or voluntarily given user data (or a combination of some or all of such data), to generate a plurality of proxy models for an application or use case. In an embodiment, a proxy model can calibrate one or more sensors to a user using one of the plurality of prediction models as a proxy model for calibrating a specific user and the sensor. In an embodiment, a proxy model provides suggestions or selections of words, phrases, or media to a user as applicable to an application. In an embodiment, the server can build a plurality of proxy models for a media presentation application. A proxy model may be generated for, e.g., a certain genre of music, age demographic, artist, instrument, media context. In an embodiment, a context can be music for working out, music for background listening during work, music for driving, music for a party, etc. The different proxy models can take into account the preferences of a particular user type or demographic. Proxy models can be generated for an application for composing or editing text, such as a messaging program, word processing program, et al.

In an embodiment, a client device can include a plurality of applications that each can use a prediction model to enhance a user's experience when operating the client device. Applications can include, e.g. speech recognition, calibration of a health sensor to the user, auto-completion of text for a particular subject matter, e.g. law, recognition of speech of the user, recognition of handwriting of the user, and suggestions media selections for the user. A client device can obtain a plurality of prediction models (proxy models) for each application from which to select a closest matching proxy model as a starting point for training to accurately represent a user's operation of the client device. In an embodiment, a client device has the plurality of proxy models initially installed on the client device. In an embodiment, the client device can request, from a model server, a plurality of proxy models for one or more applications during initialization of the client device. In an embodiment, model selection logic on the client device can initially select a default or generic proxy model from the plurality of proxy models for an application as a starting point for machine learning. As the user interacts with the client device, private user data can be collected by the client device. A divergence estimation algorithm can determine the closest match in data distribution of the private user data to the data distribution of one of the proxy models. A different proxy model can be selected for different aspects of applications or data. Machine learning can be used by the client device on the collected private user data to adapt the initially selected proxy model or a new hybrid model may be trained using a mixture of proxy data and user data. The initially selected proxy model or user data distribution can be compared against other of the plurality of proxy models for the application to determine a nearest matching proxy model. In some embodiments, a proxy model can be synthesized using an appropriately weighted mixture of other different proxy models that are acquired and deemed to be valid in the library of models. Comparison of proxy models (i.e., comparison of data distribution of private user data with data distribution of one or more proxy models) can be performed using divergence estimation techniques. If the nearest matching proxy model is within a threshold similarity, e.g. 90% or more matching to (10% or less divergent from) the initially selected and trained proxy model, then the nearest matching proxy model can be selected for use for the application and for training using machine learning on the client device. If no proxy model in the plurality of proxy models for the application sufficiently matches the initially selected and training proxy model, then the client device can notify the model server that this user cannot find a matching proxy model for the application. The model server can respond with a request that the user provide their private user data, in exchange for a suitable compensation, so that the model server can generate a matching proxy model for the user of the client device. In an embodiment, the client device can request updated proxy models for an application.

In an embodiment, a user of a client device may be prompted to answer a brief survey to aid in the initial proxy model selection process for an application. The survey responses can be retained on the client device as user private data. For example, a user may be asked his age, profession, general health (e.g. height, weight), skin tone, exercise frequency, general preference in music or other media, etc. The responses to the survey can also be used in selecting a suitable proxy model and in training a selected proxy model.

In an embodiment, a best matching proxy can be synthetically generated as a weighted mixture of feature attributes from a plurality of proxy models. The weighting factors can be determined by the adjacency of certain characteristics (for example, in some embodiments physical characteristics such as height, weight, etc.).

In an embodiment a non-transitory computer readable medium can store executable instructions, that when executed by a processing system, can perform any of the functionality described above.

In yet another embodiment, a processing system coupled to a memory programmed with executable instructions can, when the instructions are executed by the processing system, perform any of the functionality described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

The present disclosure recognizes that the use of personal information data collect from a large population of users, in the present technology, can be used to the benefit of all or many users while still maintaining the privacy of individual users. For example, the client device usage information that is learned from crowdsourced data can be identified and included in prediction models that calibrate a user to a sensor on client device, provide suggestions on-device dictionaries to provide an ordered list of trending terms, e.g., as suggestions. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
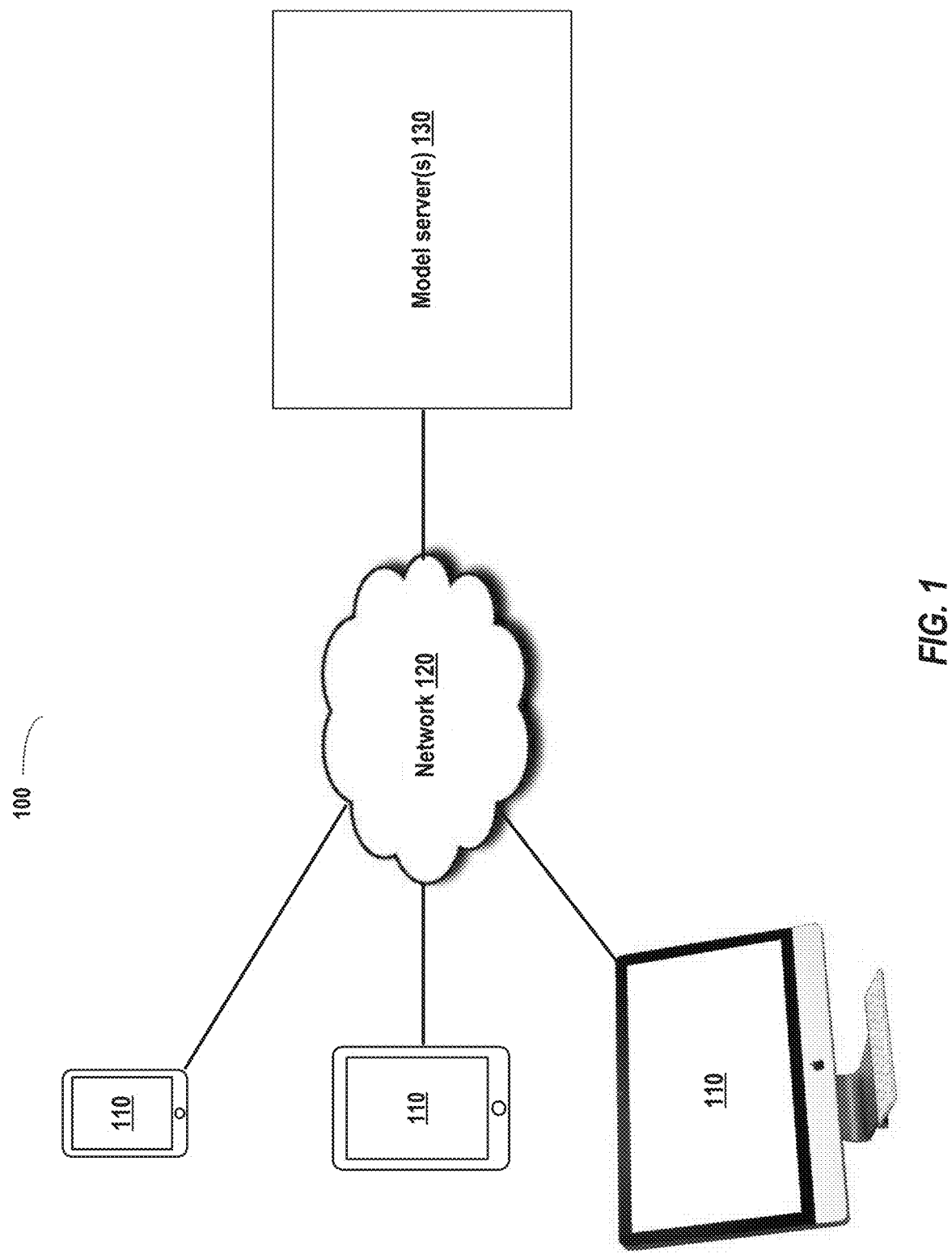
FIG. 1 illustrates, in block form, an overview of a system for learning a proxy models used by clients while preserving client privacy, according to some embodiments.

FIG. 1 illustrates, in block form, an overview of a system for learning a proxy models used by client devices 110 while preserving client privacy, according to some embodiments. A proxy model can be used by one or more applications on a client device 110 to calibrate one or more sensors on the client device 110 to the particular user of the client device 110. A proxy model can also be used to predict, suggest, or select words, phrases, content, media, or other items for presentation to the user of the client device 110 to personalize a user's experience with the client device 110, without compromising the privacy of the user of the client device 110. As a user interacts with applications on the client device 110, local machine learning on the client device 110 can learn a user's behaviors and patterns of operating the client device 110 and applications on the client device 110. The local machine learning can be compared with one or more of the proxy models provided by model server 130 to determine a closest matching proxy model to the actual user of the client device 110. The client device 110 can select the proxy model and use the proxy model, optionally as modified by private user data gathered on the client device 110, to enhance the user's experience in operating the device. Thereafter, the client device 110 use can use, and continue to train, the selected proxy model for a particular application or use case. In an embodiment, a client device 110 can initially select a generic proxy model to facilitate and speed up initial training of the client device 110. Private user data collected during the operation of the client device can be used to train the generic proxy model to more closely match the user. At a later time, a divergence estimation algorithm can be applied to the accumulated private user data and to the user data (crowdsourced, public, and paid user data) of each of the proxy models for the application or use case, to determine a better closest matching proxy model.

Client devices 110, each associated with a user in a large plurality of users, can be coupled to one or more model server(s) 130 via network 120. One or more applications on each client device 110 can generate private data that is kept on the client device 110. Private data can include specific words or phrases typed, types of documents prepared by the user, user selection(s) of URL(s), deep links, emojis typed by the user, media selected, viewed, or played back by the user. Private data can further include speech captured by a speech recognition module of the client device 110. Private data can further include calibration of the user's measurable body attributes such as heartbeat, respiration rate, skin melanin content, skin temperature, etc. to one or more sensors on the client device 110. Private data is retained on the client device 110. In an embodiment, a user can agree to voluntarily share some, or all, of the user's private data with a model server 130. In an embodiment, some of the user's private data can be anonymized or de-identified and shared with the model server 130.

Network 120 can be any type of network, such as Ethernet, Token Ring, Firewire, USB, Fibre Channel, or other network type.

Model server 130 can comprise one or more hardware processors, memory, storage devices such as one or more hard disks, solid state storage devices, CD-ROM storage, DVD-ROM storage, storage appliances, etc. Exemplary components of model server 130 are described below with reference to FIG. 7.

Figure 2:
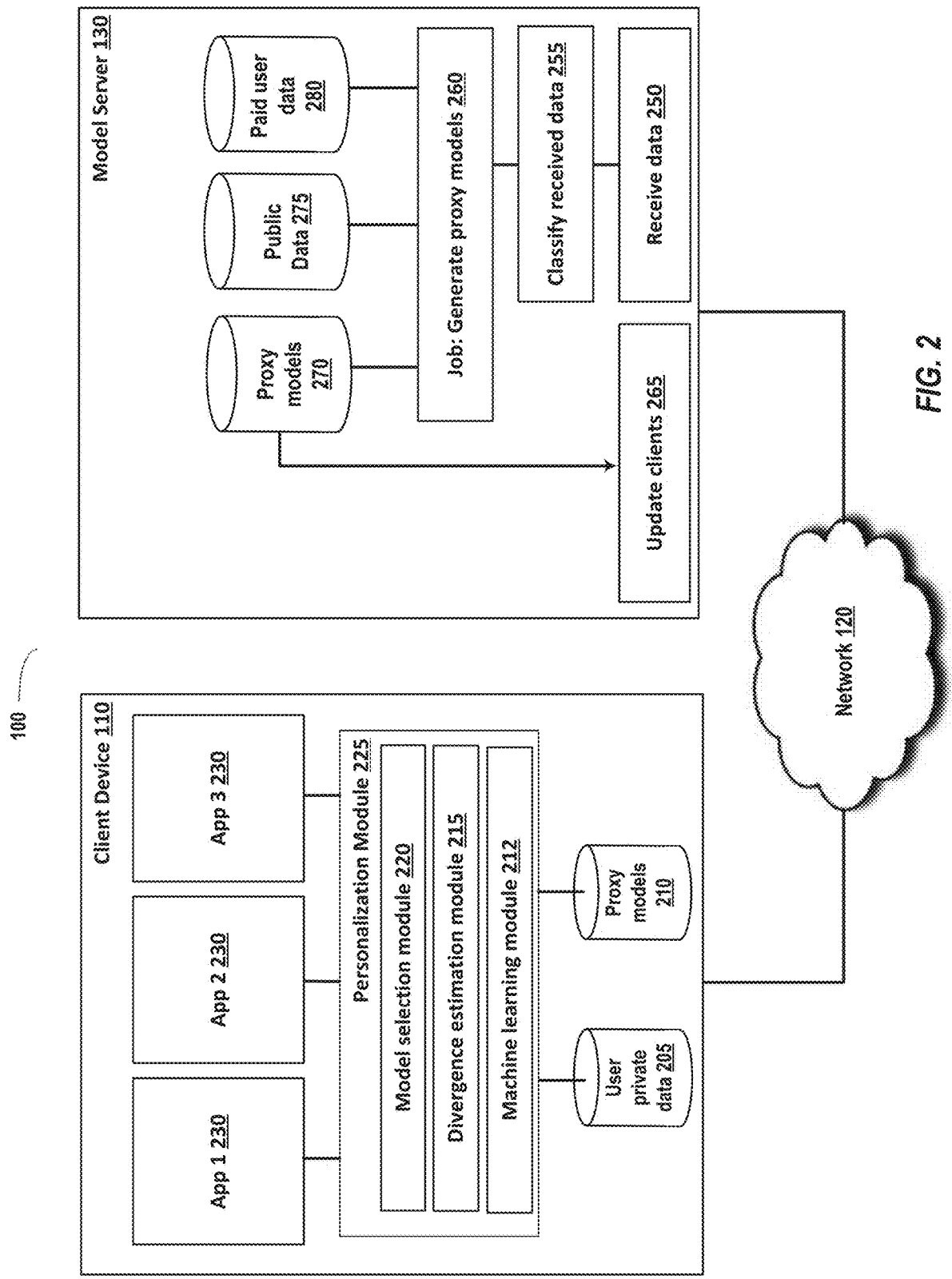
FIG. 2 illustrates, in block form, a detailed view of a system for learning proxy models used by clients while preserving client privacy, according to some embodiments.

FIG. 2 illustrates, in block form, a detailed view of a system 100 for learning proxy models used by client devices 110 while preserving client privacy, according to some embodiments.

Internal components of client device 110 can include a plurality of storages 205 and 210, a personalization module 225, and a plurality of applications 230, e.g. App 1, App 2, and App 3. Applications 230 can call one or more application programming interfaces (APIs), frameworks, system calls, or other interface to access the functionality of personalization module 225. APIs are described in detail, below, with reference to FIG. 6.

Storages 205-210 can include a private user training data 205 and proxy models 210. Proxy models 210 can be pre-installed on a newly-manufactured client device 110. Proxy models 210 can be requested by the client device 110 and received from model server 130 in response to the request. Proxy models 210 can also be provided to client device 110 via an upgrade package transmitted to, or downloaded by, the client device 110 from model server 130.

Personalization module 225 can include machine learning module 212, divergence estimation module 215, and model selection module 220.

Machine learning module 212 can apply one or more machine learning algorithms to private user data 205 collected by one or more applications 230. Machine learning algorithms can include Bayes, Naive Bayes, linear regression, and other forms of machine learning. Features can be identified within the private user data 205 by the machine learning algorithm(s), or by pre-identified features that may exist within metadata or data structures that collect the private user data 205 on the client device. For example, features of a heartbeat model can be obtained by performing a Fourier Transform in the frequency domain of a sample series of heartbeats. Features of the heartbeats can be extracted from the analysis of the Fourier Transforms of the samples. Features of a heartbeat are described below, with reference to FIG. 8A. Features of a media prediction model can be obtained from metadata or data structures that are associated with selections of media content items. For example, each music content item selected by a user can have a genre, artist, release data, run-time, live or studio indication, album reference, etc. The metadata or data structures associated with each media item selected or played by the user can be stored as user private data 205. Machine learning module 212 can train on the features in the media data selected or played. Features of a model can further be associated with a user activity, such as working, exercising, relaxing, driving, etc. such that the machine learning module 212 learns the music that a particular user likes to listen to while exercising, e.g. Features of a media metadata are described below with reference to FIG. 8B. Features of user data collected from a speech module can include a user's native language, the language of the speech recognized by the speech module (which may differ from the user's native language), mel-frequency cepstral coefficients (MFCCs) that represent a power spectrum of a short piece of sound, frequency spectrum of the speech, etc. MFCCs of a short piece of sound can be analyzed to determine that a user has, e.g., a first native language and is speaking in a second non-native language. For example, machine learning module 212 can learn that the user's first language may be French, and the user is speaking English to the speech module. User private speech data 205 can be used to build a speech calibration model on the client device 110 with which to calibrate the speech module to the user's speech.

A divergence estimation module 215 can be used to find a closest matching proxy model to a model generated from private user data 205 on the client device. In an embodiment, a divergence estimation algorithm comprises a K nearest neighbor algorithm, nonparametric divergence estimation, parametric Bayesian estimation of differential entropy and relative entropy. Example divergence estimation algorithms are described in "Nonparametric Divergence Estimation with Applications to Machine Learning on Distributions," Barnabás Póczos, Liang Xiong, Jeff Schneider, (Carnegie Mellon University); "On Estimating $L^2_2$ Divergence," Akshay Krishamurthy, Barnabás Póczos, Kirthevasan Kandasamy, and Larry Wasserman, (Proceedings of the $18^{th}$ International Conference on Artificial Intelligence and Statistics (AISTATS) 2015, San Diego, Calif.); "Parametric Bayesian Estimation of Differential Entropy and Relative Entropy," Maya Gupta and Santosh Srivastava, (Entropy 2010); and Alpha-Divergence for Classification, Indexing and Retrieval," Alfred. Hero, Bing Ma, Olivier Michel, and John Gorman, (Communications and Signal Processing Laboratory Technical Report CSPL-328, May 2001). Further examples of divergence include Kullback-Leibler divergence, Renyi's divergence, and f-divergence or Csiszar f-divergence.

Model server 130 can comprise a module to receive data 250, a module to classify received data 255 according to a classification system, and a job to generate proxy models 260 from received, anonymized, de-identified data, and/or from private user data that the user has agreed to provide to the model server 130. Model server 130 can further include storages, such as proxy model storage 270, public data storage 275, and paid user data storage 280. In an embodiment, a user can agree to provide user private data 205 to the model server 130 for some form of compensation, e.g. money, a quantity of free music downloads, or the like. Private user data 205 received by model server 130 can be stored in paid user storage 280. After one or more proxy models 270 have been generated and stored from the paid user data 280, the paid user data 280 can be incorporated in to public data storage 275. In an embodiment, after one or more proxy models 270 have been generated using the paid user data 280, and the paid user data is stored in public data storage 275, then the paid user data can be deleted from paid user data storage 280.

Receive module 250 can receive anonymized private data ("public data 275") from a large plurality of client devices 110 ("crowdsourced data"). Receive module 250 can remove from the received private data any latent identifiers, such as IP address, meta data, session identifier, or other data that might identify a particular client device 110 that sent the private data (also "public data 275"). Received data module 250 can further receive user private data 205 from one or more client devices 110 that have agreed to provide their private data 205 without anonymization ("paid user data 280"). Such users may have been specifically selected, or solicited, based upon their private data not sufficiently matching any of the existing proxy models for a particular application or use case. In an embodiment, when a client device 110 cannot match a user's private data 205 to a proxy model within a divergence estimation threshold, then the client device 110 can request one or more updated proxy models from model server 130. If client device 110 determines that the proxy models received in response to the client device request do not sufficiently match the user private data 205, client device 110 can notify model server 130 of the fact no proxy models have sufficiently matched the user private data 205. Model server 130 may solicit the user of client device 110 to receive compensation for providing the user's private data 205 so that the model server 130 can build a proxy model from the user's private data 205. If the user agrees to provide user private 205 to model server 130, then after the model server 130 can build a proxy model from the private user data. Before the model is deployed to any other user client devices 110, model server 130 can de-identify or anonymize the user's private data 205 from any proxy model built from the user's private data 205.

Classify receive data module 255 can classify the received data in accordance with application(s) 230 that may use proxy models built from the received data 250. In an embodiment, a classification can include health sensor data, speech data, text data, and media data. Each classification can have sub-classifications. For example, health sensor data may be sub-classified into the type of health sensor that generated the data, e.g. temperature sensor, heartbeat sensor, skin tone sensor, respiration sensor, et al. Media user data may be sub-classified into user data about video content, music content, podcasts, etc. Classifications can facilitate generation of proxy models for a particular application 230 or use case.

Generate proxy models job 260 can periodically process the received, de-identified ("public data 275), and private user data ("paid user data 280") to generate one or more proxy models for a classification or sub-classification of user data. After paid user data 280 has been used to generate one or more proxy models, and has been anonymized and/or de-identified, the paid user data 280 can be moved to public data 275. For a classification, or sub-classification, of user data, generate proxy models job 260 can select data of a user and use a machine learning algorithm to generate a model of the user data. A divergence estimation can be computed between the data distribution of the data used to generate the model and the data distribution of data used to generate existing models in that classification or sub-classification. If a divergence estimation distance between the data distribution for the data of the generated model and the data distribution of the data of an existing model is sufficiently small, then user data used to generate the generate model can either be discarded or can be used to reinforce learning of the existing model to which the generated model is within a threshold similarity. If a divergence estimate distance between a generated model and an existing model is sufficiently large from all other proxy models in the classification, then the model can be retained as a new proxy model. Otherwise, the generated model can be either be discarded, or retained for further training or future use. New, and updated, proxy models can be stored in proxy models 270.

An update clients module 265 can transmit updated proxy models 270 to one or more client devices 110 over network 120. In an embodiment, updated proxy models 270 are transmitted to one or more client devices 110 in response to a request from the client devices 110. In an embodiment, model server 130 can transmit updated proxy models 270 to one or more client devices 110 as a part of an update process.

Figure 3:
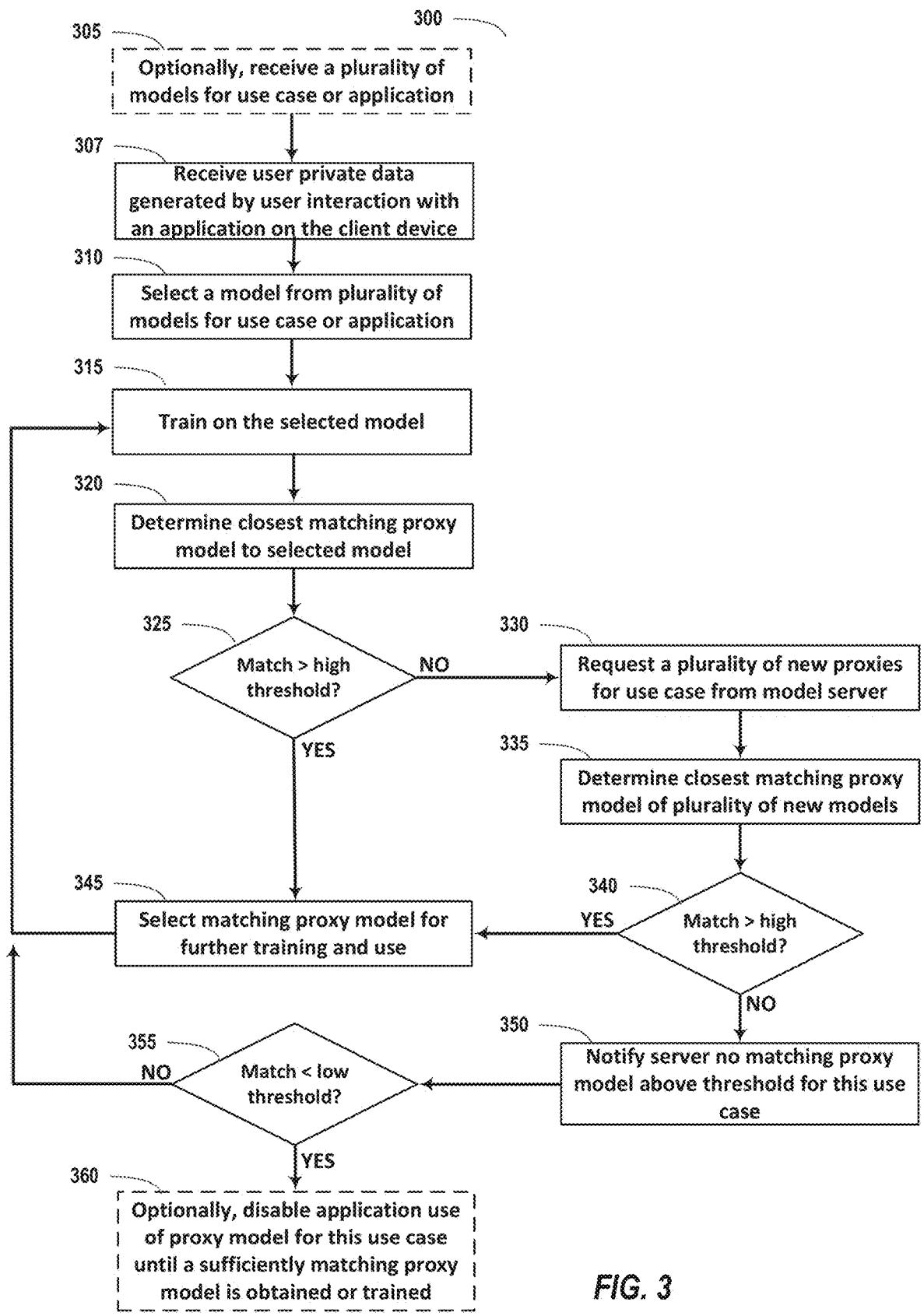
FIG. 3 illustrates, in block form, a method of a client-side process that uses proxy models generated by a server, according to some embodiments.

FIG. 3 illustrates, in block form, a method 300 of a client-side process that uses proxy models generated by a model server 130, according to some embodiments.

In operation 305, client device 110 can optionally receive a plurality of proxy models from model server 130. In an embodiment, a plurality of proxy modules are already installed on the client device from, e.g., the time of manufacture or from a previous update of proxy models.

In operation 307, client device 110 can collect private user data generated by a user interacting with an application 230 on the client device 110.

In operation 310, model selection module 220 of client device personalization module 225 can select a model from the plurality of proxy models 210 available on the client device 110 for an application 230 or use case, e.g. speech recognition. A use case is a functionality that is used by one or more applications 230. In an embodiment, model selection module 220 can select a default model for the application 230. In an embodiment, the default model for the application 230 can be a generic model for the application or use case.

In operation 315, a user can interact with the client device 110 using an application 230. Data generated by the application 230 can be used as training data for the selected proxy model. Machine learning module 212 can train the selected proxy model using the user's private training data.

In operation 320, divergence estimation module 215 can compute a divergence estimate between the selected proxy model that has been trained with the user's private data, and one or more other proxy models in the plurality of proxy models 210 for the application 230. A particular proxy model, among the plurality of proxy models for the application 230, can be a closest match to, i.e. least divergent from, the selected proxy model trained with the user's private data.

In operation 325, the module selection module 220 can determine whether the proxy model having the least divergence from the trained proxy model is sufficiently similar to the trained generic model. In an embodiment, a proxy model is sufficiently similar to the trained proxy model if the proxy model is at least a 90% match to (10% or less divergent from) the selected proxy model that was trained using private user data.

If, in operation 325, it is determined that the closest matching proxy model is sufficiently similar to the trained generic model, then method 300 continues at operation 345.

If, in operation 325, it is determined that the closest matching proxy model is not sufficiently similar to the selected model, trained with private user data (e.g. less than 90% match, or divergence estimate is greater than 10%), then in operation 330 the client device 110 can request one or more new proxy models for the application 230 or use case from the model server 130. Between the time that the client device 110 last received an update to proxy models 265, it is possible that new proxy models 270 have been added on model server 130 for the application 230 or use case. Client device 110 can request one or more of these new proxy models 270. In an embodiment, the client request for updated proxy models for the application 230 can include version information about the proxy models 270 currently available on client device 110 to aid the model server is fulfilling the request with appropriate proxy models 270.

In operation 335, divergence estimation module 215 and model selection module 220 can determine a closest matching proxy model from the plurality of newly received proxy models from the model server 130. Operation 335 is analogous to operation 320, except that operation 335 is performed on the proxy models received in response to the request in operation 330.

In operation 340, it can be determined whether the closest matching proxy model of the newly received proxy models is sufficiently similar to the trained generic model on the client device 110. Operation 340 is analogous to operation 325, except that operation 340 is performed on the proxy models received in response the request of operation 330.

If, in operation 340, it is determined that the closest matching proxy model is sufficiently similar to the selected model of operation 310, trained in operation 315, then method 300 continues at operation 345.

If, in operation 340, it is determined that there is no proxy model that sufficiently matches the model selected in operation 310 and trained in operation 315, then the method 300 continues at operation 350.

In operation 345, the closest matching proxy model can be selected for training and use on the client device 110 for the application 230 or use case. The closest matching proxy model is then associated with one or more applications 230 that use the functionality for which the proxy model is intended, e.g. speech recognition, health sensor calibration, text prediction, media content prediction, et al. Method 300 then continues at operation 315.

In operation 350, client device 110 can notify model server 130 that no proxy model sufficiently matches the proxy model selected in operation 310 and trained in operation 315 for the application 230. Model server 130 may automatically solicit the user of the client device 110 to provide his private data 205 for the application 230 to the model server 130 so that the model server 130 can generate and train a proxy model that fits this particular user, and other similar users. In an embodiment, an administrator of the model server 130, or other personnel, may solicit the user of client device 110 to provide his private user data 205 for use by the model server 130 in making a proxy model that will fit the user of the client device 110. Method 300 then continues at operation 355.

In operation 355, it can be determined whether the proxy model selected in operation 310 and trained in operation 315 is so dissimilar to any of the plurality of proxy models on, or received by, the client device 100 for the application 230 that the functionality provided by using a proxy model to represent attributes of this user should be disabled. In an embodiment, if the proxy model selected in operation 310 is less than a 60% match (40% divergent or more) to any of the proxy models, then in operation 360, proxy model functionality can optionally be disabled for this application 230 or use case until a sufficiently matching proxy model is obtained or trained. Otherwise, the method 300 continues at operation 315.

Figure 4:
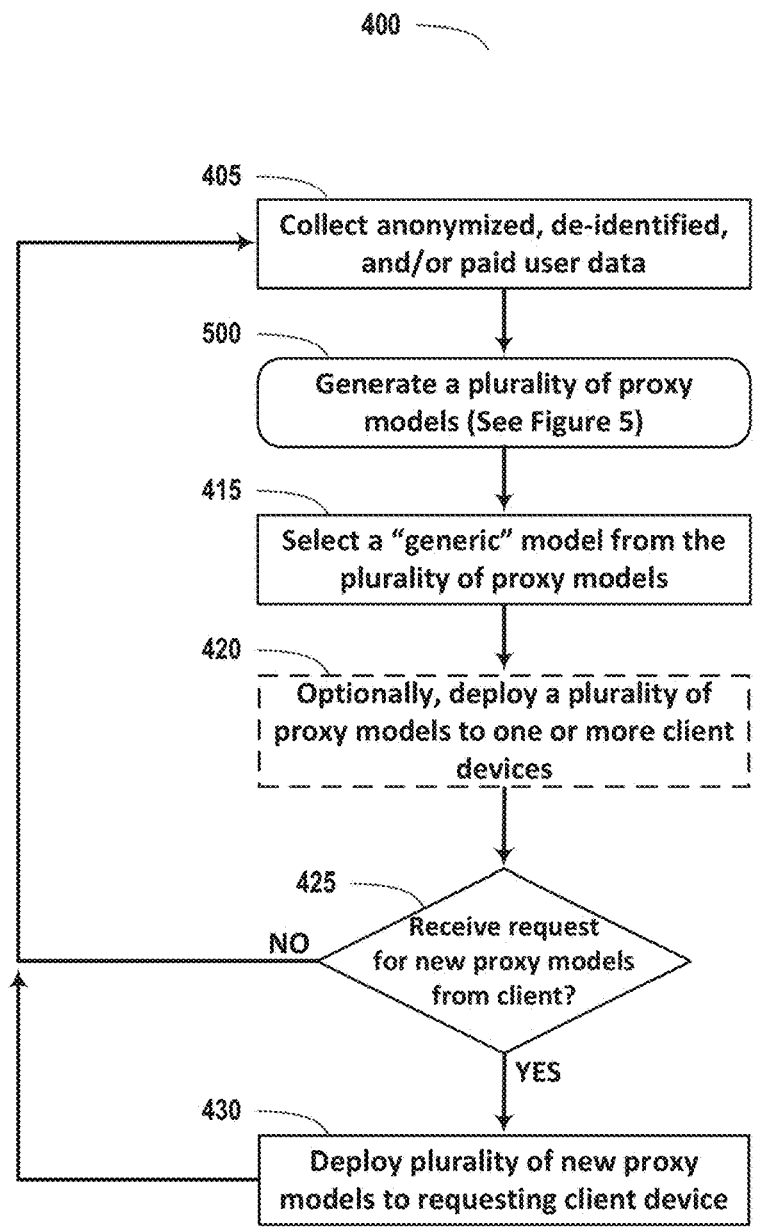
FIG. 4 illustrate, in block form, a method of a server learning proxy models used by clients while maintaining client device privacy, according to some embodiments.

FIG. 4 illustrates, in block form, a method 400 of a server learning proxy models used by clients while maintaining client device privacy, according to some embodiments. Method 400 can be performed for a particular classification, or sub-classification, of proxy model.

In operation 405, model server 130, received data module 250 can receive anonymized, or private (paid) user data. In an embodiment, receive data module 250 can de-identify received user data. Classify received data module 255 can classify the received and de-identified user data into one or more classifications and, optionally, sub-classifications. A classification can be, e.g., user data that provides a model of a user to calibrate client device sensors to the user, a prediction model to predict words, phrases or other text that a user may type in a document or message, a prediction module that can predict media items that a user would like, et al. A sub-classification of e.g. a media prediction model would be a prediction model by media type (video v. music), genre (rock, jazz, country, R&B), by context (gym, work, relaxing, party, date), etc.

In operation 500, generate proxy models job 260 can generate a plurality of proxy models 270 for a classification or sub-classification of proxy models from the classified received user data 255. Operation 500 is described, below, with reference to FIG. 5.

In operation 415, generate proxy models job 260 can select and designate a "generic" model from the plurality of proxy models. A generic proxy model is a proxy model that sufficiently matches at least a subset of the plurality proxy models generated in operation 500 that the generic proxy model can be designated as a good starting point for most users to train the generic proxy model to represent the user's behaviors, preferences, or characteristics within a reasonable period of training time. In an embodiment, the generic model is at least a 70% match for a majority of the features of the proxy model for at least a subset of the plurality of proxy models. In an embodiment, the generic proxy model is substantially equally divergent from a subset of the plurality of proxy models.

In operation 420, generate proxy models job 260 can optionally invoke update clients module 265 to deploy a plurality of updated proxy models 270 for the classification.

In operation 425, it can be determined whether model server 130 has received one or more requests for new proxy models 270 from one or more client devices 110. In an embodiment, model server 130 can receive a request for updated proxy models 270 in response to a client device 110 determining that no existing proxy model for a classification is within a threshold matching similarity to a model trained on the client device 110 using private data of the user of the client device. In an embodiment, model server 130 can receive a request for updated proxy models 270 in response a client device 110 being powered on a first time. In an embodiment, model server 130 can receive a request for updated proxy models 270 for a classification in response to a client device 110 application 230 being run for a first time. In an embodiment, model server 130 can receive a request for updated proxy models 270 in response to a client device 110 application 230 that uses the classification of proxy models being run at any time.

If, in operation 425, model server 130 does not receive a request for updated proxy models 270 for the classification, then method 400 can continue at operation 405. In an embodiment, method 400 waits for a predetermined period of time before continuing at operation 405. In an embodiment, generate new proxy models job 260 is run at predetermined intervals. In an embodiment, generate new proxy models job 260 is run when a threshold amount of data for a classification is received by receive data module 250 new proxy models can be generated from the received data.

If, in operation 425, a request for updated proxy models 270 is received from a client device 110, then in operation 430, model server 130 can invoke update clients model 265 to transmit one or more updated proxy models 270 for the classification to requesting client device 110.

Figure 5:
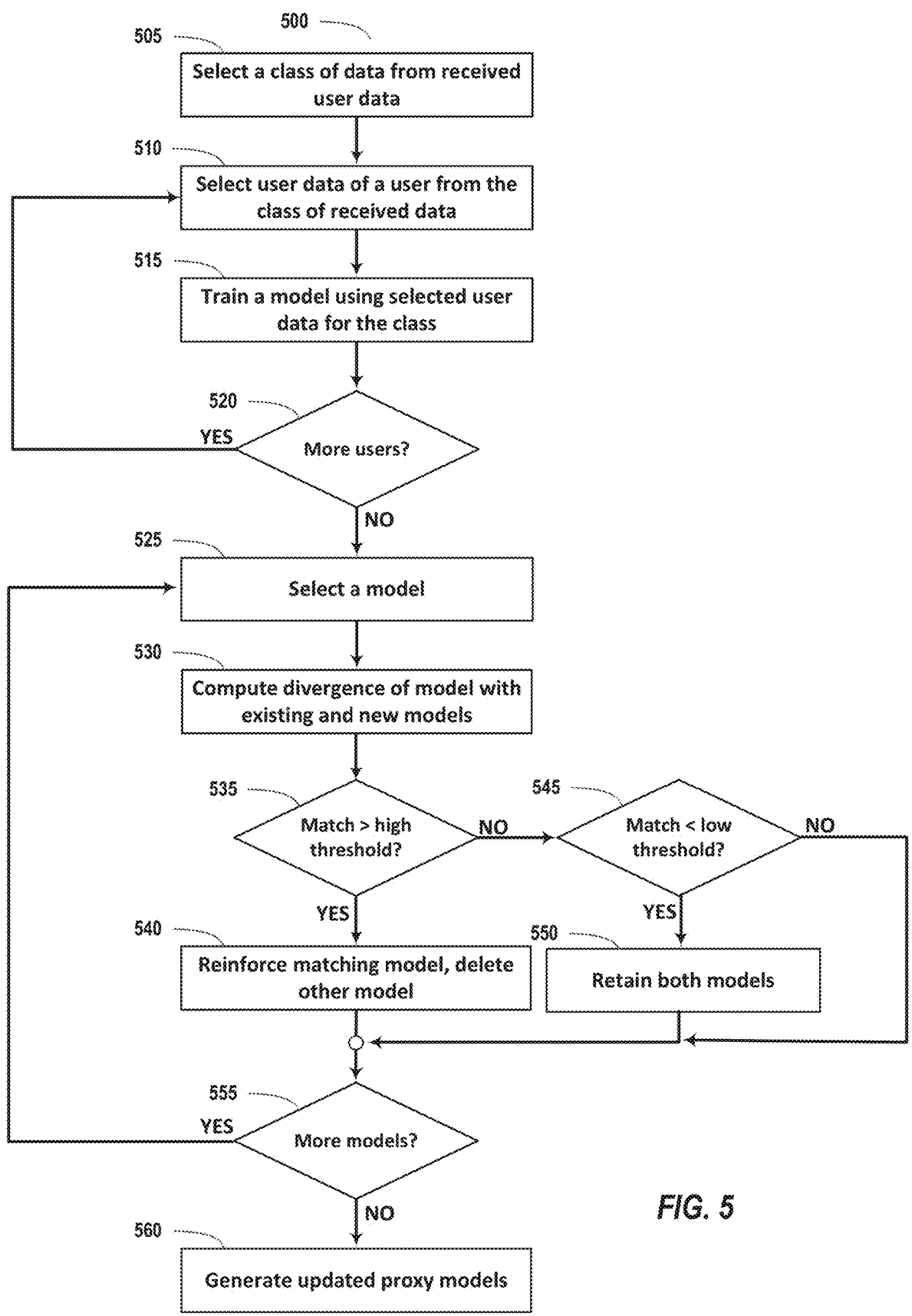
FIG. 5 illustrates, in block form, a method of a model server learning new proxy models from paid user data, public data, and received user data, according to some embodiments.

FIG. 5 illustrates, in block form, a method 500 of a model server 130 learning new proxy models 270 from paid user data 280, public data 275, and received user data 250, according to some embodiments. Proxy models can be generated on a per classification, or sub-classification, basis. In an embodiment, generate proxy models job 260 on model server 130 can utilize one or more existing proxy models 270 for the classification as a starting point for training new proxy models 270 for the classification.

In operations 505-520, a plurality of proxy models are generated for a classification using classified received data 255, public data 275, and paid user data 280. In operations 525-545, the plurality of proxy models are compared to one another, by divergence estimation, to determine how similar, or different, each of the proxy models is to one another. If two proxy models are very similar, e.g. a 90% or greater match (i.e., 10% or less divergent) then one can of the proxy models can be used to reinforce the training of the other, and one proxy model can be deleted. If two proxy models are very dissimilar, e.g. 10% or less match (i.e., 90% or more divergent) then both proxy models can be retained as being proxy models that represent two different types of users.

In operation 505, generate proxy models job 260 can select a classification of data from received user data, with which generate proxy models job 260 will generate one or more new proxy models 270 for the classification. In an embodiment, generate proxy models job 260 can also select user data, and/or existing proxy models, for the classification from public data 275 or paid user data 280 for use in generating new proxy models 270.

In operation 510, generate proxy models job 260 can select user data of a user from the classified received data 255.

In operation 515, generate proxy models job 260 can train a model using the selected classified received data 255. In an embodiment, an existing proxy model can be used as a starting point for training a proxy model using the classified received data 260. Training can include using machine learning algorithms to train the proxy model to determine features of the proxy model for the classification. Machine learning algorithms can include Bayes, Naive Bayes, linear regression, and other forms of machine learning. Features can be identified within the private user data 205 by the machine learning algorithm(s), or by pre-identified features that may exist within metadata or data structures that collect the private user data 205 on the client device.

In operation 520, it can be determined whether there are more user's data to process from the classified received data 255. If so, then method 500 resumes at operation 510. Otherwise, method 500 continues at operation 525.

The following operations determine an amount of similarity, or dissimilarity, of any two proxy models.

In operation 525, one of the plurality of candidate proxy models generated in operations 505-520 can be selected.

In operation 530, a divergence estimate can be computed as between the selected proxy model and each of the existing and newly generated proxy models for the classification.

In operation 535, for each divergence estimate between the selected proxy model and existing and newly generated proxy models, it can be determined whether the selected proxy model the divergence estimate indicates a match with an existing or newly generated proxy model. A match threshold can be 90% or more matching, i.e. 10% or less divergent, from the existing or newly generated proxy model.

If, in operation 535 it is determined that the selected proxy model is a match for an existing or newly generated proxy model, then in operation 540 the selected newly generated proxy model can be used to reinforce the matching proxy model and the method 500 continues at operations 555. Otherwise, the method 500 continues at operation 545.

In operation 545, it can be determined whether the selected proxy model is sufficiently divergent, i.e., greater than 90% divergent from (10% or less similar to) each of the existing and newly generated models. If so, then method 500 continues at operation 550 wherein it is determined that the selected proxy model should be retained, and the method continues at operation 555.

If, in operation 545, it is determined that the selected proxy is less than 90% divergent from (greater than 10% similar to) each of the existing and newly generated proxy models, then method 500 continues at operation 555.

In operation 555, it is determined whether there are more proxy models to analyze for divergence estimation. If so, then the method 500 continues at operation 525 wherein a next newly generated proxy model is selected. Otherwise method 500 continues at operation 560.

In operation 560, if there are any newly generated proxy models remaining that have not been subsumed as reinforcement for another proxy model, then proxy models 270 can be updated. Dissemination of updated proxy models is described above in method 400, with reference to FIG. 4.

Figure 6:
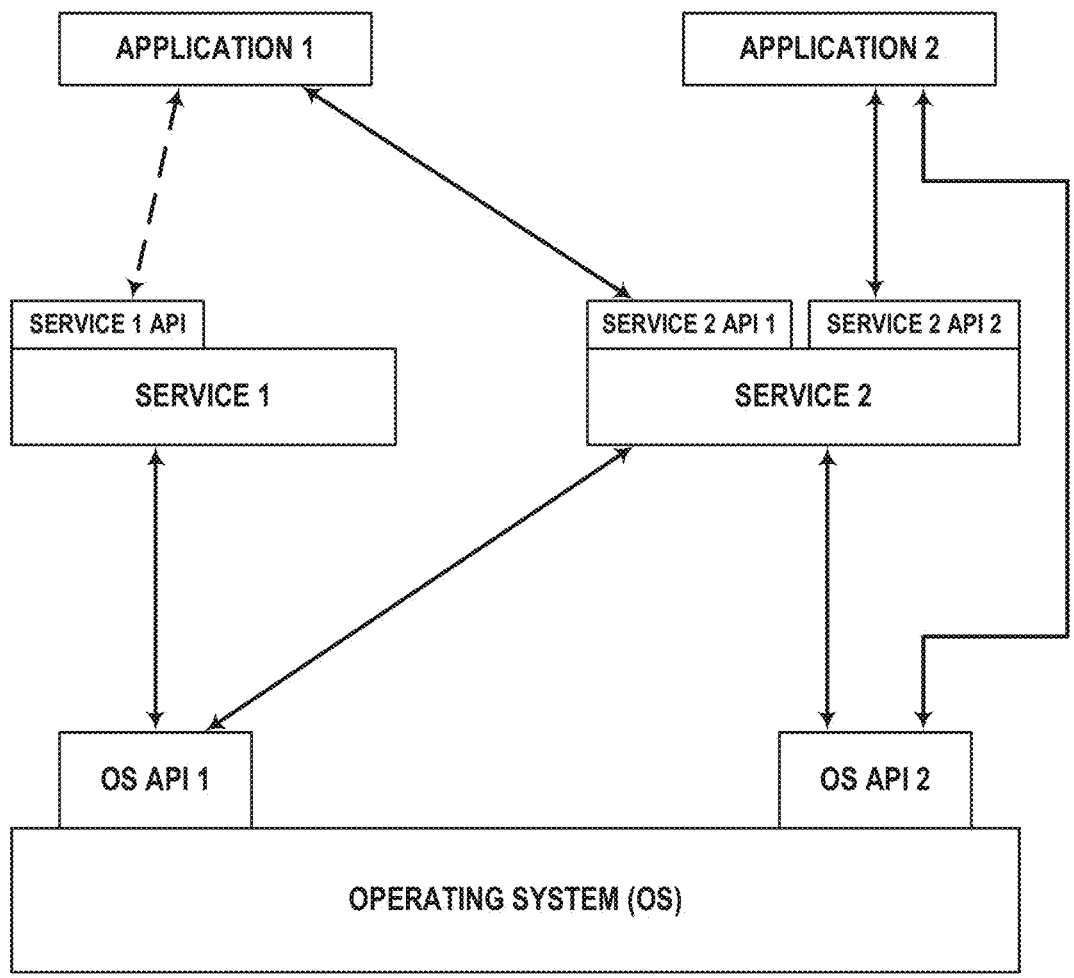
FIG. 6 illustrates an exemplary embodiment of a software stack usable in some embodiments of the invention.

In FIG. 6 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 7:
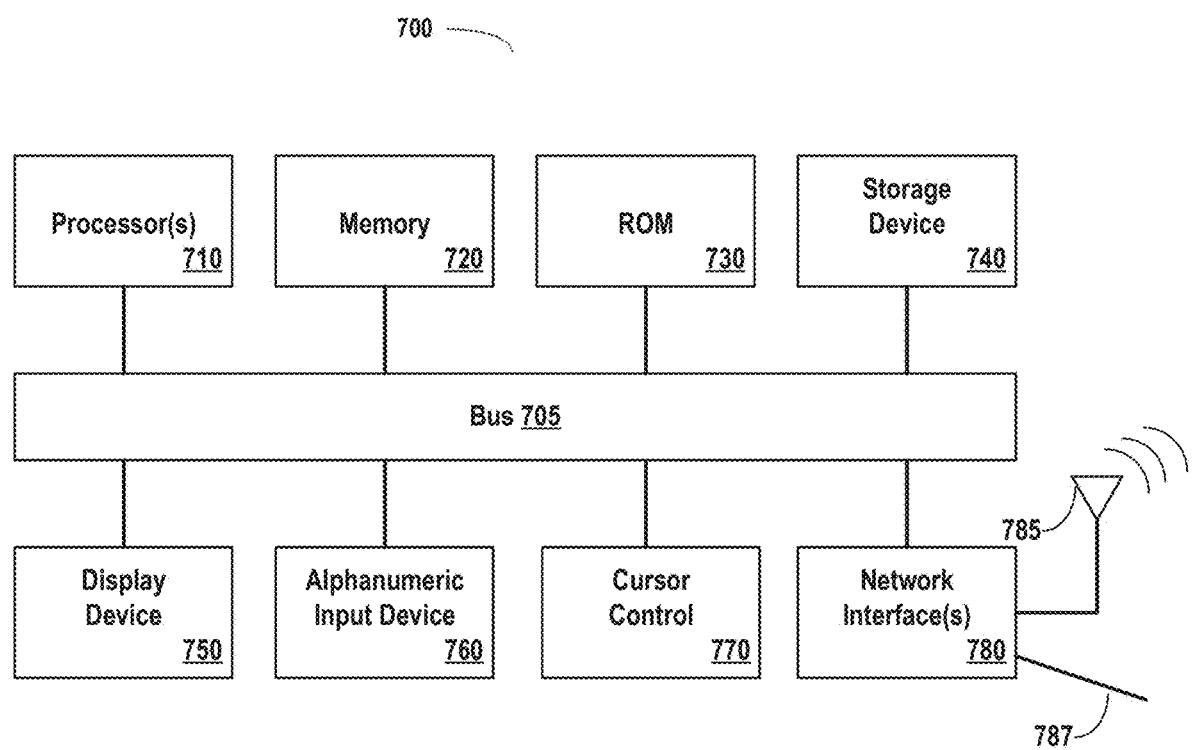
FIG. 7 is a block diagram of one embodiment of a computing system.

FIG. 7 is a block diagram of one embodiment of a computing system 700. The computing system illustrated in FIG. 7 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 7 may be used to provide the computing device and/or the server device.

Computing system 700 includes bus 705 or other communication device to communicate information, and processor 710 coupled to bus 705 that may process information.

While computing system 700 is illustrated with a single processor, computing system 700 may include multiple processors and/or co-processors 710. Computing system 700 further may include random access memory (RAM) or other dynamic storage device 720 (referred to as main memory), coupled to bus 705 and may store information and instructions that may be executed by processor(s) 710. Main memory 720 may also be used to store temporary variables or other intermediate information during execution of instructions by processor 710.

Computing system 700 may also include read only memory (ROM) and/or other static storage device 740 coupled to bus 705 that may store static information and instructions for processor(s) 710. Data storage device 740 may be coupled to bus 705 to store information and instructions. Data storage device 740 such as flash memory or a magnetic disk or optical disc and corresponding drive may be coupled to computing system 700.

Computing system 700 may also be coupled via bus 705 to display device 750, such as a cathode ray tube (CRT) or liquid crystal display (LCD), to display information to a user. Computing system 700 can also include an alphanumeric input device 760, including alphanumeric and other keys, which may be coupled to bus 705 to communicate information and command selections to processor(s) 710. Another type of user input device is cursor control 770, such as a touchpad, a mouse, a trackball, or cursor direction keys to communicate direction information and command selections to processor(s) 710 and to control cursor movement on display 750. Computing system 700 may also receive user input from a remote device that is communicatively coupled to computing system 700 via one or more network interfaces 780.

Computing system 700 further may include one or more network interface(s) 780 to provide access to a network, such as a local area network. Network interface(s) 780 may include, for example, a wireless network interface having antenna 785, which may represent one or more antenna(e). Computing system 700 can include multiple wireless network interfaces such as a combination of WiFi, Bluetooth® and cellular telephony interfaces. Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figures 8A, 8B:
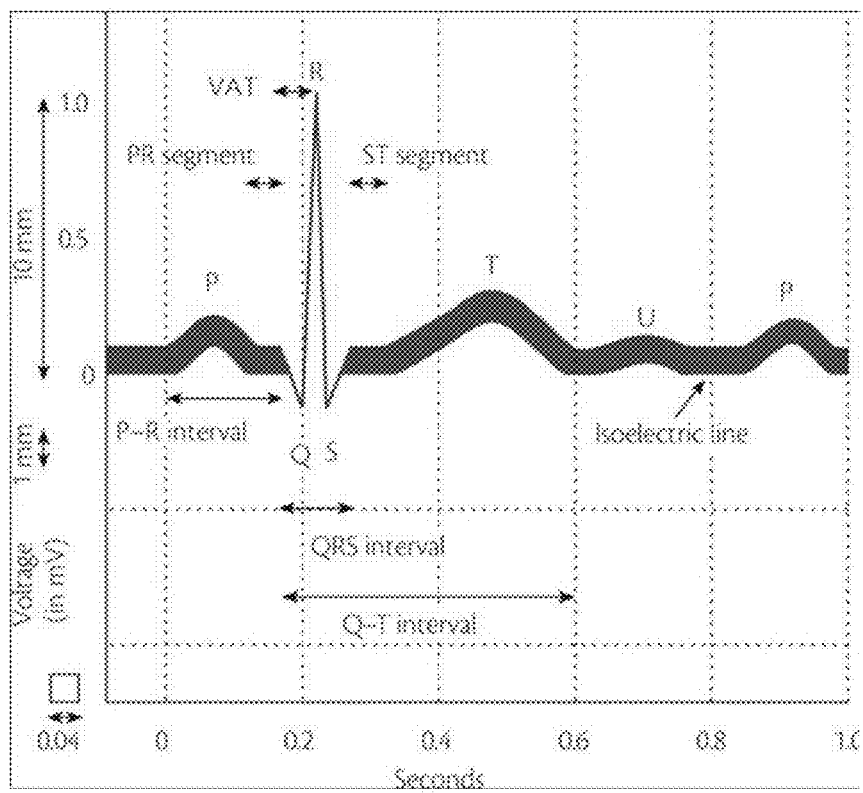
FIG. 8A illustrates features of a heart beat.
FIG. 8B illustrates features of a media metadata, according to some embodiments.

FIG. 8A illustrates features of a heartbeat, according to some embodiments.

One use case for proxy models is calibration of sensors, such as a heartbeat sensor, to a particular user. A heartbeat has a plurality of attributes, described below. These attributes can differ between users. A digital algorithm, such as a Fast Fourier Transform (FFT) can be used to analyze the heartbeat sensor information. As can be seen in the heartbeat example of FIG. 8A, the features of a single heartbeat may appear within 0.2 second windows. The sampling window is too wide, e.g. 0.5 seconds, then the heartbeat sensor may miss a peak and may miscount the heartbeat by one half. Reporting an incorrect heartbeat rate can have serious consequences for the user.

The P wave of heartbeat waveform is a representation of the contraction of the atrial muscle and has a duration of approximately 60-100 milliseconds (ms). It has a low amplitude of approximately 0.1-0.25 millivolts (mV) and is usually found at the beginning of a heartbeat. The following features of a heartbeat are described in "Individual Identification Using Linear Projection of Heartbeat Features," Yogendra Narain Singh, (Applied Computation Intelligence and Soft Computing Volume 2014, Article ID 602813, Aug. 10, 2014). The intervals of a heartbeat, described below, are named with reference to the letters shown on the FIG. 8A indicating the portions of the heartbeat referred to. For example, the QRS interval represents the main contraction of the ventricles of a heartbeat.

The QRS wave is a sharp bi-phasic or tri-phasic wave of approximately 80-120 ms duration and shows a signification amplitude deflection that varies by person. This variation in amplitude, and bi-phasic v. tri-phasic wave form can be calibrated for a user using a suitable proxy model. The PR interval is the time taken for ionic potential to spread from sinus node through the atrial muscle and entering the ventricles is about 120-200 ms. The ventricles have a relatively long ionic potential duration of 300-420 ms known as the QT interval. The plateau part of ionic potential is about 80-120 ms after the QRS interval and is known as the ST segment. The return of the ventricular muscle to its resting ionic state causes the T wave that has an amplitude of about 0.1-0.5 mV and a duration of 120-180 ms. The duration from resting of ventricles to the beginning of the next cycle of atrial contraction is known as the TP segment which as a long plateau part of negligible elevation.

FIG. 8B represents metadata and data structures that may be used to describe media selected by a user. A proxy model can be built by generate proxy models job 260 using de-identified crowdsourced data, paid user data, and public data.

The music that a person selects can be based upon the activity that the user is performing at a given time. For example, a user may select one kind of music while driving, another while exercising, another while working, and yet another while walking. Using onboard sensors of a client device 110, such as GPS, ambient noise, heart-rate of the user, motion sensing of the client device, applications running on the client device 110 (e.g. an exercise program, a GPS driving map), whether the device is docked and/or charging, WiFi is enabled and has maintained a fixed WiFi or cell tower reference for a period of time, the client device 110 can determine with reasonable accuracy whether the user is walking, running, driving, exercising, or likely working. The above client device usage context information used for sub-classifications of the classification of media usage proxy models.

Media items that a user may select can have metadata associated with them. Music media metadata can include artist, album, track number, duration, release data, one or more music genres, a typical demographic that enjoys the music identified in the metadata, a format of the media, such as MP3, bit-rate, bit-depth and other media metadata. These examples of media metadata can be used as features, along with client device usage context features, described above, to generate a proxy model that predicts media usage of a user.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method of providing a personalized prediction model for a user, practiced on a client device, comprising:
   collecting private user data on the client device, wherein access to the collected private user data is safeguarded and secured in accordance with privacy policies and procedures;
   selecting an initial model from a set of proxy models on the client device associated with an application;
   performing training of the selected initial model using the collected private user data;
   for each of one or more proxy models in the set of proxy models, performing a divergence estimate between a data distribution of the trained selected model and a corresponding data distribution of the proxy model;
   determining a proxy model, from the one or more proxy models on the client device, having a least divergence estimate from the trained selected model;
   in response to the least divergence estimate between the trained initial model and the proxy model having the least divergence estimate being less than a threshold:
      associating the proxy model with the user and the application; and
      calibrating the functionality of the application using the proxy model as a user predictive model for the application.

2. The method of claim 1, further comprising:
   in response to the least divergence estimate being greater than the threshold, requesting a new set of proxy models from the server; and
   receiving, by the client device, the new set of proxy models from the server in response to the request.

3. The method of claim 1, wherein the selected initial model is a generic proxy model that sufficiently matches at least a subset of the set of proxy models to be used as a starting point, for most users, to train the generic proxy model with the collected private user data to represent the user's behaviors, preferences, or characteristics.

4. The method of claim 3, further comprising:
   for one or more of the proxy models in the requested new set of proxy models, performing a divergence estimate between the data distribution of the trained selected model and a corresponding data distribution of the proxy model;
   determining the proxy model having the least divergence estimate to the trained initial model;
   in response to the least divergence estimate being less than the threshold:
      associating the proxy model with the user and the application and
      calibrating the functionality of the application using the proxy model as a user predictive model for the application.

5. The method of claim 4, further comprising:
in response to the least divergence estimate being greater than the threshold, disabling use of the trained initial model as a predictor for the application.

6. The method of claim 1, wherein the user predictive model calibrates one or more sensors of the client device to the user, and wherein training comprises the client device using machine learning on the collected private user data to adapt the selected initial model to represent the user's behaviors, preferences, or characteristics.

7. The method of claim 6, wherein the one or more sensors comprise a health sensor that includes a heart-rate monitor.

8. The method of claim 1, wherein the user predictive model calibrates a speech recognition module to the user, wherein the user predictive model incorporates feature vectors including components comprising a language in which the user is speaking, mel-frequency cepstral coefficients, and activations of deep neural networks.

9. The method of claim 1, wherein the user predictive model predicts one of:
a subject matter of text that a user is composing or editing in the application, and the user predictive model suggests words or phrases to the user in the application; or
a genre or artist of media type to present to the user, and the model suggests or plays media items in the application.

10. The method of claim 1, wherein performing a divergence estimate comprises applying a K nearest neighbor divergence estimation algorithm to the initial data distribution and a data distribution of one of the set of proxy models.

11. The method of claim 1, further comprising:
requesting, by the client device, one or more new proxy models, in response to determining that no proxy model in the set of proxy models has a low divergence below the threshold value;
receiving the new set of proxy models; and
in response to determining that no proxy model within the received set of new proxy models has a divergence estimate that is less than a threshold value, and the divergence estimate of the initial selected trained model being less than a second, higher, threshold value, continuing to train the selected initial model.

12. The method of claim 1, wherein a set of proxy models relates a classification of the set of proxy models to the functionality and a sub-classification of the set of proxy models is associated with user attributes or preferences within the classification.

13. The method of claim 1, wherein the privacy policies and procedures comprise one or more of:
de-identifying or anonymizing private user data before sharing the private user data with a server; or
obtaining the user's consent prior to sharing the private user data with the server;
compensating the user in exchange for the user consenting to sharing the private user data.

14. A non-transitory computer readable medium programmed with instructions that, when executed by a processing system, perform operations of providing a personalized prediction model for a user, comprising:
collecting private user data on the client device, wherein access to the collected private user data is safeguarded and secured in accordance with privacy policies and procedures;
selecting an initial model from a set of proxy models on the client device associated with an application;
performing training of the selected initial model using the collected private user data;
for each of one or more proxy models in the set of proxy models, performing a divergence estimate between a data distribution of the trained selected model and a corresponding data distribution of the proxy model;
determining a proxy model, from the one or more proxy models on the client device, having a least divergence estimate from the trained selected model;
in response to the least divergence estimate between the trained initial model and the proxy model having the least divergence estimate being less than a threshold:
associating the proxy model with the user and the application; and
calibrating the functionality of the application using the proxy model as a user predictive model for the application.

15. The medium of claim 14, further comprising:
in response to the least divergence estimate being greater than the threshold, requesting a new set of proxy models from the server; and
receiving, by the client device, the new set of proxy models from the server in response to the request.

16. The medium of claim 14, wherein the selected initial model is a generic proxy model that sufficiently matches at least a subset of the set of proxy models to be used as a starting point, for most users, to train the generic proxy model with the collected private user data to represent the user's behaviors, preferences, or characteristics.

17. The medium of claim 14, wherein the user predictive model calibrates one or more sensors of the client device to the user, and wherein training comprises the client device using machine learning on the collected private user data to adapt the selected initial model to represent the user's behaviors, preferences, or characteristics.

18. The medium of claim 17, wherein the one or more sensors comprise a health sensor that includes a heart-rate monitor.

19. The medium of claim 14, wherein the user predictive model calibrates a speech recognition module to the user, wherein the user predictive model incorporates feature vectors including components comprising a language in which the user is speaking, mel-frequency cepstral coefficients, and activations of deep neural networks.

20. The medium of claim 14, wherein the user predictive model predicts one of:
a subject matter of text that a user is composing or editing in the application, and the use predictive model suggests words or phrases to the user in the application; or
a genre or artist of media type to present to the user, and the model suggests or plays media items in the application.

21. The medium of claim 14, wherein performing a divergence estimate comprises applying a K nearest neighbor divergence estimation algorithm to the initial data distribution and a data distribution of one of the set of proxy models.

22. A system comprising:
a processing system coupled to a memory programmed with executable instructions that, when executed by the processing system perform operations of providing a personalized prediction model for a user, comprising:
collecting private user data on the client device, wherein access to the collected private user data is safeguarded and secured in accordance with privacy policies and procedures;
selecting an initial model from a set of proxy models on the client device associated with an application;

performing training of the selected initial model using the collected private user data;

for each of one or more proxy models in the set of proxy models, performing a divergence estimate between a data distribution of the trained selected model and a corresponding data distribution of the proxy model;

determining a proxy model, from the one or more proxy models on the client device, having a least divergence estimate least from the trained selected model;

in response to the least divergence estimate between the trained initial model and the proxy model having the least divergence estimate being less than a threshold:
  associating the proxy model with the user and the application; and
  calibrating the functionality of the application using the proxy model as a user predictive model for the application.

23. The system of claim 22, further comprising:
in response to the least divergence estimate being greater than the threshold, requesting a new set of proxy models from the server; and
receiving, by the client device, the new set of proxy models from the server in response to the request.

24. The system of claim 22,
wherein the selected initial model is a generic proxy model that sufficiently matches at least a subset of the set of proxy models to be used as a starting point, for most users, to train the generic proxy model with the collected private user data to represent the user's behaviors, preferences, or characteristics.

25. The system of claim 22, wherein the user predictive model calibrates one or more sensors of the client device to the user, and wherein training comprises the client device using machine learning on the collected private user data to adapt the selected initial model to represent the user's behaviors, preferences, or characteristics.

26. The system of claim 25, wherein the one or more sensors comprise a health sensor that includes a heart-rate monitor.

27. The system of claim 22, wherein the user predictive model calibrates a speech recognition module to the user, wherein the user predictive model incorporates feature vectors including components comprising a language in which the user is speaking, mel-frequency cepstral coefficients, and activations of deep neural networks.

28. The system of claim 22, wherein the user predictive model predicts one of:
  a subject matter of text that a user is composing or editing in the application, and the user predictive model suggests words or phrases to the user in the application; or
  a genre or artist of media type to present to the user, and the model suggests or plays media items in the application.

29. The system of claim 22, wherein performing a divergence estimate comprises applying a K nearest neighbor divergence estimation algorithm to the initial data distribution and a data distribution of one of the set of proxy models.

30. A computer-implemented method practiced on a server comprising at least one hardware processor, the method comprising:
  training, by the server, a plurality of models for a functionality of an application, by performing machine learning using private user data that has been obtained in accordance with privacy policies and procedures, and the private user data is at least one of anonymized data, de-identified data, or voluntarily-provided data of identified users with the consent of each identified user, collected on the server for the application used by one or more client devices;
  performing, by the server, a divergence estimate between pairs of models in the plurality of models to identify a subset of the plurality of models for inclusion in a set of proxy models, wherein each model in the subset of the plurality of models calibrates the functionality of the application to a different group of users;
  in response to determining that a pair of models both have a divergence estimate less than a threshold value, reinforcing the training on one of the models in the pair and deleting the other model in the pair;
  designating one of the models in the set of proxy models as a generic proxy model that sufficiently matches at least a subset of the set of proxy models to be used as a starting point, for most users, to train the generic proxy model using collected user private data on a particular client device;
  transmitting, by the server, the set of proxy models to one or more client devices, in response to a request from a client device for one or more new proxy models associated with the functionality of the application on the client device.

* * * * *